(12) United States Patent
Pajerski et al.

(10) Patent No.: US 10,266,651 B2
(45) Date of Patent: Apr. 23, 2019

(54) WATER DISPERSIBLE POLYAMIDE BUILDING BLOCKS

(71) Applicant: Lubrizol Advanced Materials, Inc., Cleveland, OH (US)

(72) Inventors: Anthony D. Pajerski, Broadview Heights, OH (US); Gabor Erdodi, Macedonia, OH (US); Naser Pourahmady, Solon, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 15/535,946

(22) PCT Filed: Dec. 14, 2015

(86) PCT No.: PCT/US2015/065543
§ 371 (c)(1),
(2) Date: Jun. 14, 2017

(87) PCT Pub. No.: WO2016/100201
PCT Pub. Date: Jun. 23, 2016

(65) Prior Publication Data
US 2018/0002484 A1    Jan. 4, 2018

Related U.S. Application Data

(60) Provisional application No. 62/093,503, filed on Dec. 18, 2014.

(51) Int. Cl.
| | |
|---|---|
| C08G 69/46 | (2006.01) |
| C08G 69/26 | (2006.01) |
| C08G 69/48 | (2006.01) |
| C08G 18/64 | (2006.01) |
| C08G 69/42 | (2006.01) |
| C09D 177/00 | (2006.01) |

(52) U.S. Cl.
CPC .......... *C08G 69/46* (2013.01); *C08G 18/6469* (2013.01); *C08G 69/26* (2013.01); *C08G 69/42* (2013.01); *C08G 69/48* (2013.01); *C09D 177/00* (2013.01); *C08L 2201/50* (2013.01)

(58) Field of Classification Search
USPC .......................................... 528/332, 335–353
See application file for complete search history.

(56) References Cited

U.S. PATENT DOCUMENTS

| | | | | |
|---|---|---|---|---|
| 2,926,154 | A * | 2/1960 | Keim | C08G 69/48 162/164.3 |
| 4,732,966 | A * | 3/1988 | Wilson | C08G 59/54 525/420.5 |
| 4,873,311 | A * | 10/1989 | Bornack, Jr. | C08G 69/48 528/272 |
| 5,804,682 | A * | 9/1998 | Fischer | C08J 3/07 523/223 |
| 5,948,880 | A * | 9/1999 | Fischer | C08G 69/34 524/238 |
| 2013/0157020 | A1* | 6/2013 | Crandon | C09D 5/002 428/201 |

FOREIGN PATENT DOCUMENTS

| | | |
|---|---|---|
| EP | 877 063 A2 * | 5/1998 |
| WO | 2013/120816 A1 | 8/2013 |
| WO | 2014/126739 A1 | 8/2014 |
| WO | 2014/126741 A2 | 8/2014 |
| WO | 2016/100201 A1 | 6/2016 |

OTHER PUBLICATIONS

Search Report of Corresponding International Application No. PCT/US2015/065543 dated Mar. 11, 2016.
Written Opinion of Corresponding International Application No. PCT/US2015/065543 dated Mar. 11, 2016.

* cited by examiner

*Primary Examiner* — Marc S Zimmer
(74) *Attorney, Agent, or Firm* — Samuel Laferty; Teresan Gilbert

(57) ABSTRACT

Water dispersible polyamides having carboxylic acid groups are disclosed. These are made by reacting polycarboxyl is acids or anhydrides thereof with amine containing monomer or an amide terminated polyamide under reaction conditions such that a few of the carboxylic acid groups are residual and can promote dispersion in water. These polyamides after dispersion can be chain extended to higher molecular weight polymers or can be terminally functionalized with reactive groups such as isocyanate, epoxy, vinyl, acetoacetonate, or silanol groups. Composites and hybrids of these polyamides with vinyl polymers are also disclosed and claimed.

14 Claims, 3 Drawing Sheets

WATER DISPERSIBLE POLYAMIDE BUILDING BLOCKS

CROSS REFERENCE TO RELATED APPLICATION

This application is a national phase entry under 35 U.S.C. 371 of PCT/US2015/065543 filed Dec. 14, 2015, which claims the benefit of U.S. Provisional Application No. 62/093,503 filed Dec. 18, 2014.

FIELD OF INVENTION

The invention relates to aqueous dispersion of polyurethane/urea polymers with polyamide segments containing carboxylic acid groups that can be salted to be water dispersible polyamides. Desirably, these polyamides contain many N-alkylated polyamide segments. The polycarboxylic acid monomers are reacted with amine terminated polyamides under mild reaction conditions of time and temperature such that some of the carboxylic acid groups are not converted to polyamides. Incorporating dispersing carboxylic acid groups into the polyamide segments by this method rather than incorporating polyisocyanate reactive polyols containing secondary carboxylic acids avoids having ester linkages in the polymer and the need for polyisocyanates to make the water dispersible prepolymer. The polyamide can provide good solvent resistance, good elastomeric properties, resistance to UV radiation, hydrolysis resistance, etc.

BACKGROUND OF THE INVENTION

EP 595281(A2) to BASF published May 4, 1994 and teaches a water dispersible ionic and nonionic polyamide modified polyurethane for use in automobile clearcoat and basecoat systems. The AU equivalent is AU 4903693.

EP 595286(A1) to BASF published May 4, 1994 and interpreted based on AU-B-49162/93 teaches a solvent borne polyamide modified polyurethane resin for use in automotive clearcoat and basecoat.

"Novel Poly(urethane-amide)s from Polyurethane Prepolymer and Reactive Polyamides. Preparation and Properties", Polymer Journal, Vol. 34, No. 6, pp 455-460 (2002) describes a soluble polyamide containing aliphatic hydroxyl group in the backbone that were reacted with a polyurethane prepolymer with isocyanate groups that were endcapped with phenol. The polyamide and prepolymer were mixed together and cast on glass substrates. The cast films were treated with heat to release the phenol, thereby unblocking the isocyanates, which then reacted with the hydroxyl groups of the polyamide.

U.S. Pat. No. 7,276,570 assigned to Acushnet Company discloses compositions for golf equipment, such as golf balls comprising thermoplastic, thermoset, castable, or millable elastomer compositions comprising at least one polymer having a plurality of anionic moieties attached thereto. The compositions can be used as part of golf ball construction.

WO2006/053777 A1 to Novartis Pharma GmbH discloses crosslinkable poly(oxyalkylene) containing polyamide prepolymers that can be used to provide water-soluble prepolymers that can be used as a component in contact lenses.

US 2006/0047083A1 published Mar. 2, 2006 discloses triblock thermoplastic polymers of the ABA type wherein the A blocks represent hard segments such as urethane, urea, urethane-urea, or amide type segments and the B blocks represent soft segments such as aliphatic polyethers, aliphatic polyesters, poly(dimethylsiloxane)s, polyalkanes and their copolymers.

US2008/081870A1 (equivalent to EP 190577(A2)) to Bayer describes a size composition comprising polyurethane-polyurea repeat units with carboxylic amide containing repeat units. The backbone contains 0.75 to 10 wt. % C(O)—NH groups. The composition is used as a sizing for glass fibers used in nylon compositions.

U.S. Pat. No. 5,610,224 (equivalent to EP059581) to BASF discloses an ionic and nonionic polyamide modified polyurethane polymers for use in coating compositions, method for forming, and coating compositions containing these polymers.

US 2008/0223519 A1 (equivalent WO2008/070762 A1) assigned to Arizona Chemical Company discloses polyamide polyols and polyurethanes, methods for making and using and products made therefrom. It discloses reaction products of a polymeric and non-polymeric diamine with dicarboxylic acid and hydroxy substituted carboxylic acid. It also discloses reactions of the polyamide with diisocyanates.

"Polyurethane-Amide Hybrid Dispersions", Journal of Polymer Engineering, Vol. 29, Nos. 1-3, pp 63-78, 2009 describes aqueous polyurethanes with amide groups in the hard segments that were made by chain extending the prepolymer with various dicarboxylic acids. The particle size, mechanical and dynamic mechanical properties of cast films along with water swell and adhesion were studied.

WO2011/052707A1 titled Aqueous Polyamide Resin Dispersion, Method for Producing the Same, and Laminate, discloses making a solvent dispersible polyamide for laminates.

US 2011/0124799 A1 to E. I. Du Pont de Nemours and Company describes inkjet inks for textiles containing crosslinked polyurethanes and further containing additional reactive components.

EP 449419 A1 describes reacting primary aminoalcohols with acid terminated polyamideethers to create hydroxyl terminated polymers.

WO2014/126741 discloses polyamide dispersions in water that have superior properties over polyurethane dispersions. These use secondary amine containing monomers and result in tertiary amide linkages between the repeating units. These can use anionic, cationic, or nonionic dispersing moieties within the prepolymer.

SUMMARY OF THE INVENTION

This invention relates to water dispersible polyamides useful to make a dispersion in aqueous media comprising one or more polyamide segments. The composition may contain small amounts of other polymers and materials either as physical blends or where the other polymers or materials are co-reacted into the polyamide segments. The polyamides are made water dispersible by reacting the polyamides or the monomers to make the polyamides with polycarboxylic acids (aliphatic and/or aromatic) under reaction conditions where a percentage of the carboxylic acids groups are retained as carboxylic acid groups and not converted to amide linkages. The water dispersible polyamides will also be referred to as polyamide prepolymer or just prepolymer. The residual carboxylic acid groups can be salted with various bases (typically low molecular weight bases such as KOH, NaOH, and amines such as ammonium hydroxide or triethanol amine) to enhance their ability to disperse the polyamide in water. Desirably, the residual carboxylic acid groups are present at concentrations such that the measured acid number of the polyamide prepolymer is from about 1 to about 60 or 100 mgKOH/g of polyamide, more desirably from about 10 to about 35, 60 or 100 mgKOH/g of polyamide. The term polyamide oligomer will refer to an oligomer with two or more amide linkages, or sometimes the amount of amide linkages will be specified.

In one embodiment, the polyamide prepolymer is colloidally dispersed in water and is the reaction product of an amine terminated polyamide oligomer or amine terminated monomers with a polycarboxylic acid or a partial or complete anhydride of a polycarboxylic acid. In preferred embodiments, the colloidal particles are characterized by their size and the polyamide is further characterized by its composition. A small amount of compatible solvent or ethylenically unsaturated monomers (such as free radically polymerizable monomers such as acrylic monomers) may be used to reduce the prepolymer viscosity to facilitate dispersion in water (functioning as a plasticizer).

In a preferred embodiment, the polyamide prepolymer will have, in addition to the specified amount of carboxylic acid generating the acid number, at least one terminal amine group and preferably more than one terminal amine group, such as about two terminal amine groups per prepolymer. Thus, after dispersing the prepolymer in water using the carboxylic acid groups as the dispersing groups, the amine terminal group(s) can be reacted with additional chemical species that chain extend the polyamide prepolymer to a higher molecular weight. Alternatively, the amine terminal group(s) can be reacted with chemical species (before or after dispersion in water) to convert the terminal functionality to epoxy, isocyanate, silane, acetoacetonate, or vinyl groups. The decision whether to convert before or after dispersion in water is affected by whether the terminal functionalization reaction can be achieved quickly and economically in the presence of a water phase.

DETAILED DESCRIPTION OF THE INVENTION

Figure 1:
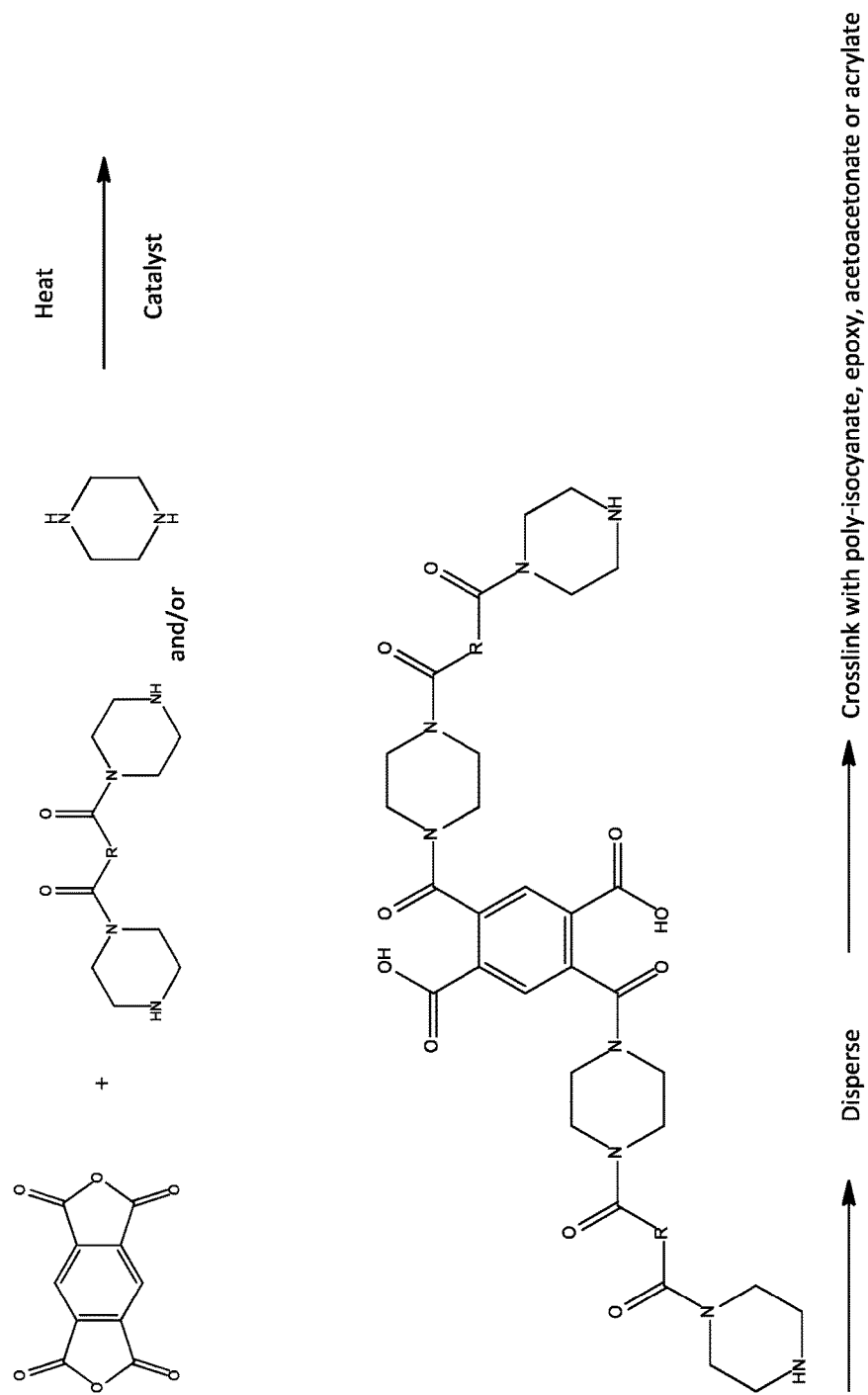
FIGS. 1-3 illustrate in chemical formulas and flow diagrams how the polyamide building blocks of this disclosure can be prepared. While the polyacid is illustrated as pyromellitic dianhydride in FIGS. 1-3, the polyacid component may be any aliphatic, aromatic, or oligomeric polyacid or poly-anhydride component as described later.
Figure 2:
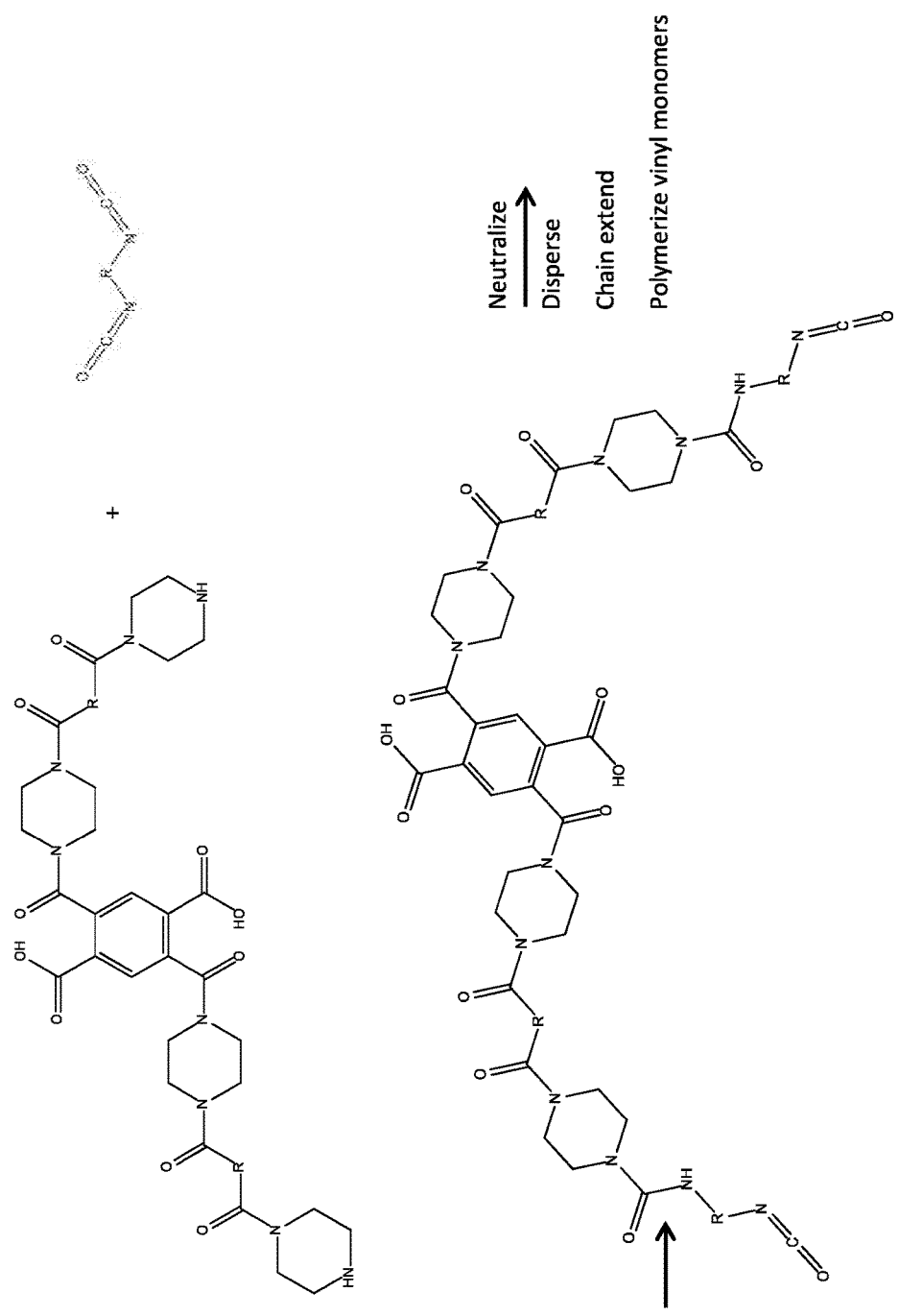
Figure 3:
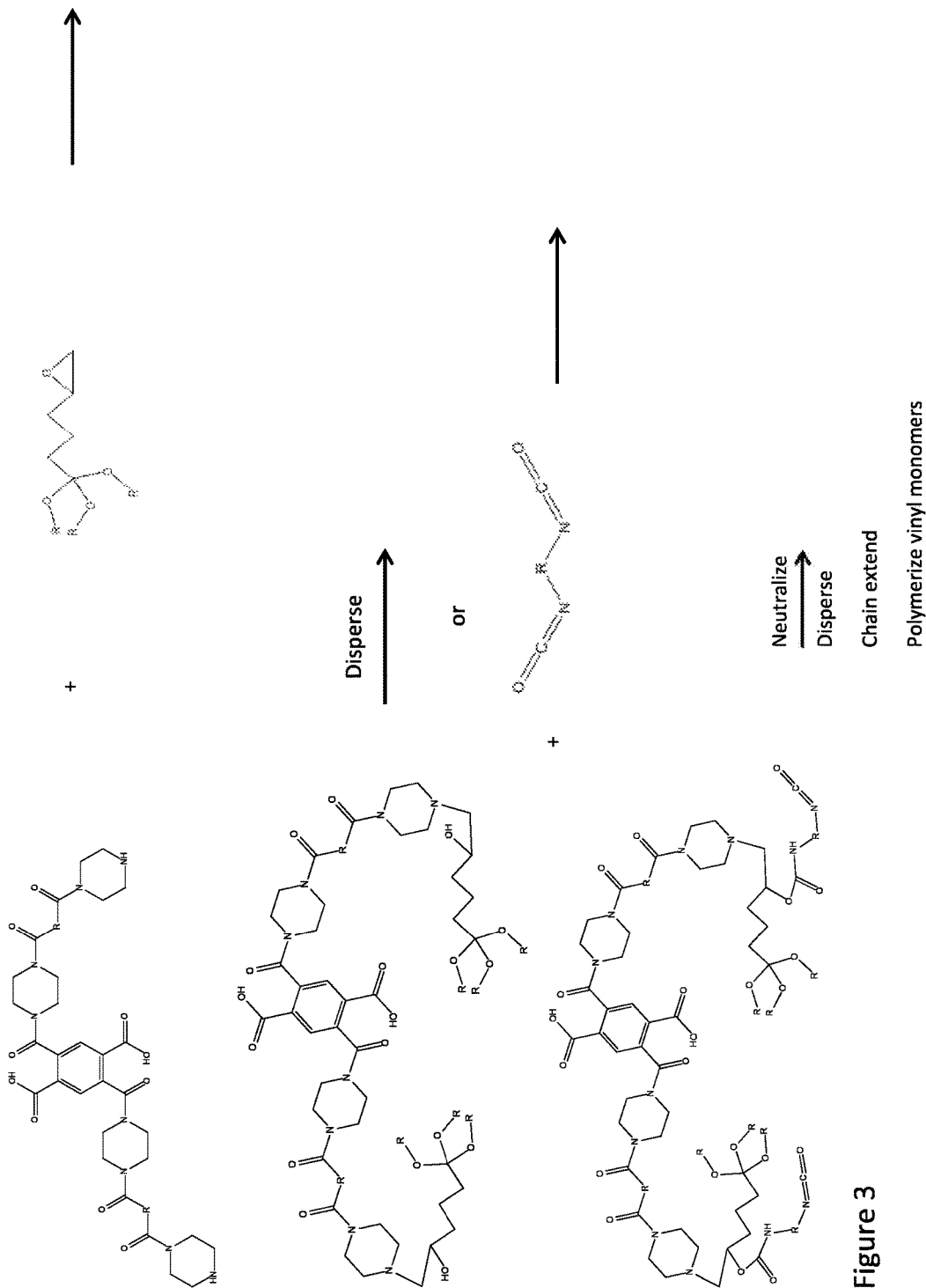

Definitions: We will use the parentheses to designate 1) that the something is optionally present such that monomer(s) means monomer or monomers or (meth)acrylate means methacrylate or acrylate, 2) to qualify or further define a previously mentioned term, or 3) to list narrower embodiments.

The polyurea/urethane polymers and prepolymers of this disclosure are an extension of polyurethane dispersion terminology utilizing polyamide segments as prepolymers and chain extending the amide segments after dispersion formation. The dispersed polyamide can also be further functionalized into other groups after dispersion.

Thus, polymers made from polyamide segments can have good solvent resistance. Solvents can stress a polymer by swelling thereby causing premature failure of the polymer or parts from the polymer. Solvents can cause a coating to swell and delaminate from a substrate at the interface between the two. Adding polyamide to a polymer can increase adhesion to substrates that have similar or compatible surfaces to polyamides.

In a preferred embodiment, the polyamide prepolymer will have, in addition to the specified amount of carboxylic acid generating the acid number, at least one terminal amine group and preferably more than one terminal amine group, such as about two terminal amine groups per prepolymer. Thus, after dispersing the prepolymer in water using the carboxylic acid groups as the dispersing groups, the amine terminal group(s) can be reacted with additional chemical species that chain extend the polyamide prepolymer to a higher molecular weight. In one embodiment, polyisocyanates may be reacted with the amine terminal groups and in another embodiment polyepoxides may be reacted with the amine terminal groups to chain extend the polyamides. Alternatively, the amine terminal group(s) can be reacted with chemical species (before or after dispersion in water) to convert the terminal functionality to epoxy, isocyanate, silane (e.g. mono, di, tri, or tetra alkoxysilane), acetoacetonate, or vinyl groups. The decision whether to convert before or after dispersion in water is affected by whether the terminal functionalization reaction can be achieved quickly and economically in the presence of a water phase.

With polyurethane technology, dispersing acid groups were usually incorporated via reactions of hydroxyl groups on the acid bearing species with polyisocyanates. Using the current polyamide technology with reactive amine groups, the amine groups eliminate the need for polyisocyanate reactants. A polycarboxylic acid species can be reacted directly with the amine terminal groups. If one of the carboxylic acid groups from the polycarboxylic acid is left unreacted, that carboxylic acid functionality can be the dispersing group for the polyamide. If a tricarboxylic acid is used, a polyamide can bond to the left side of the polycarboxylic acid and a second polyamide can react to the right side of the polycarboxylic acid, creating a dispersing group near the center of a polyamide having nearly twice the molecular weight of either starting polyamide. Alternatively, one could use a polyamide on the left and a diamine on the right to create a polyamide with a carboxylic acid dispersing group near one end of the molecule.

To achieve the desired acid number (the correct number of dispersing groups), one would generally first prepare the polyamide segments of the desired molecular weight by reacting dicarboxylic acids with diamines in the proper ratio, or reacting aminocarboxylic acids (or lactams) with themselves at a relative high temperature to form polyamide linkages. If reactants with one carboxylic acid group and one amine group (e.g., forming the polyamide from aminocarboxylic acids or lactams) were used, one could add some diamine to convert any terminal acid groups to amine terminal groups. Typically, if acid groups are used one would remove molecules of water to push the reaction to completion. It is acknowledged that the reaction of anhydrides or dianhydrides with amines to form amide linkages can be accomplished at relative low temperatures (e.g. under 70° C.) while reacting carboxylic acid with amine groups to amide linkages typically is run above 100° C. to remove water. It is well known in the art how to adjust the stoichiometry of amide forming reactants to get the desired molecular weight and terminal groups. One could monitor the extent of reaction of the carboxylic acid groups by taking samples and titrating the residual carboxylic acid groups. Near the end of this polyamide forming reaction, one could add additional polycarboxylic acids, if desired, in the correct amount and react one or two of the carboxylic acid groups of the polycarboxylic acid with amine groups of the polyamide to bind the polycarboxylic acid into the polyamide. Again, the residual carboxylic acid groups (i.e., those not converted to amide linkages) can be preserved by cooling the reactants below the amide forming reaction temperature.

Generally, the monomers for forming the polyamide will be difunctional (e.g., dicarboxylic acid and diamine, aminocarboxylic acid, or lactam. The polyacids will generally be tricarboxylic acid or higher carboxylic functionality. Some of the acid groups of the polycarboxylic acid can be in the anhydride of a dicarboxylic acid form. Desirably, most of the amine functionality used in the polyamide will be secondary amide groups (either di-hydrocarbon substituted amines or cyclic amines (like piperazine)). If one uses a blend of primary amines and secondary amines, the primary amines will tend to react before the secondary amines. Primary amines can form imide structures if sufficient carboxylic acid groups are present and if the possibility to form 5 or 6 membered rings exists. As set forth later secondary amine groups are preferred in this disclosure.

The polycarboxylic acids used to impart carboxylic acid groups for dispersing the polyamide can be aliphatic, aromatic (or possess combinations of aromatic and aliphatic segments) or be oligomeric. Generally, if low molecular weight they have from about 3 to about 30 carbon atoms and more desirably from about 5 to about 25 carbon atoms. If they are oligomeric they can be up to 6000, 5000,or 4000 g/mole number average molecular weight. The polycarboxylic acids desirably have at least two carboxylic acids and more preferably have at least three carboxylic acid groups. If the polycarboxylic acid is in anhydride form, this facilitates reacting the polycarboxylic acid with the amine groups to form amide linkages at a lower temperature (e.g., below 70° C. rather than above 100° C. for an acid group). Examples of a suitable non-aromatic polycarboxylic acids include agaric acid, citric acid (2-hydroxy-1,2,3,-propanetricarboxylic acid), 1,3,5-cyclohexanenetric carboxylic acid, 1,2,3-propanetricarboxylic acid (tricarballylic acid), 1-propene-1,2,3-tricarboxylic acid, N-[1,2-dicarboxyethyl]-L-aspartic acid, 1,2,5-pentanetricarboxylic acid, 1,3,5-pentanetricarboxylic acid, 3-butene-1,2,3-tricarboxylic acid, 1,2,3,4-butanetetracarboxylic acid, ethylenediamine tetraacetic acid (EDTA), ethylenediamine tetrapropionic acid, N,N'-ethylene di-(L-aspartic acid), or mixtures thereof, or anhydride thereof. Examples of aromatic polycarboxylic acids include 1,2,4,5-benzenetetracarboxylic; 1,2,4,5-benzenetetracarboxylic dianhydride; 1,2,4-benzenetricarboxylic acid anhydride; and 1,2,4-benzenetricarboxylic acid. Examples of oligomeric polyacid or polyanhydrides include maleated polybutadiene and maleated triglyceride oils (e.g., maleated soybean, linseed, etc. oil).

A particularly useful feature of this disclosure is the ability to convert the terminal functional groups of the polyamide to other functional groups or to chain extend the polyamide after dispersion in water. The possibility of chain extension after dispersion is because the rate of reaction of isocyanate groups with amine groups is relatively fast compared to the reaction rate of water with isocyanate groups. Thus, in this type of system most of the polyisocyanates react with the amine groups giving the desired reaction product rather than reacting with water and giving an undesired reaction product.

Thus, it is desirable that a high percentage of the terminal groups of the polyamide prepolymer are initially amine groups. Thus, it is desirable that at least 70, 80 or 90 mole % of the terminal groups of the prepolymer are amine terminal groups. It is also desirable that a high percentage of the terminal groups on the polyamide prepolymer are secondary amine terminal groups rather than primary amine terminal groups. Thus, it is desirable that at least 50, 60, 70, 80, or 90 mole % of the terminal groups on the polyamide prepolymer are secondary amine terminal groups.

At this point it would be good to explain that many of the polyamides of the prior art are high melting point crystalline polyamides such as 6-nylon, 6,6-nylon, 6,10-nylon that melt temperatures much too high, in excess of 100° C., to serve as soft segments if a blocky thermoplastic polymer is desired. In some of the prior art publications the polyamide, often a crystalline or high Tg polyamide type, was added merely to increase the surface interaction with a substrate that was compatible to polyamides. To create a lower Tg polymer soft, low Tg, polyester, polyether or polycarbonates were added to the polyamide segment to provide a lower composite Tg elastomeric segment. In other prior art publications, only a few polyamide linkages were inserted into a polymer to modify the polarity of the polymer to increase solvent resistance or raise the softening temperature.

One objective of the current patent application is to use high percentages of amide linkages in a polymer segments incorporated via reaction with polyisocyanates into a copolymer with thermoplastic, optionally elastomeric, properties to provide resistance to chain scission from hydrolysis and UV activated chain scission. Replacing ester linkages in polymers by amide linkages is anticipated to result in polymers with better retention of physical properties on aging. Thus, many embodiments will describe soft segments with high percentages of total linkages between repeat units in the soft segment being amide linkages. Some embodiments may allow for some linkages between repeat units to be other than amide linkages. In some embodiments, the linkages between the polyamide oligomer and the isocyanate groups of the polyisocyanate will have significant portions of urea linkages. Urea linkages tend to have a higher melting temperature than urethane linkages and therefor provide higher use temperatures.

An important modification from conventional polyamides to get low Tg polyamide soft segments is the use of monomers with secondary amine terminal groups in forming the polyamide. The amide linkage formed from a secondary amine and a carboxylic acid type group is called a tertiary amide linkage. Primary amines react with carboxylic acid type groups to form secondary amides. The nitrogen atom of a secondary amide has an attached hydrogen atom that often hydrogen bonds with a carbonyl group of a nearby amide. The intra-molecular H-bonds induce crystallinity with high melting point and act as crosslinks reducing chain mobility. With tertiary amide groups the hydrogen on the nitrogen of the amide linkage is eliminated along with hydrogen bonding. A tertiary amide linkage that has one additional alkyl group attached to it as compared to a secondary amide group, which has hydrogen attached to it, has reduced polar interactions with nearby amide groups when the polymer exists in a bulk polymer sample. Reduced polar interactions mean that glassy or crystalline phases that include the amide linkage melt at lower temperatures than similar amide groups that are secondary amide groups. One way to source secondary amine reactant, a precursor to tertiary amide linkages, is to substitute the nitrogen atom(s) of the amine containing monomer with an alkyl group. Another way to source a secondary amine reactant is to use a heterocyclic molecule where the nitrogen of the amine is part of the ring structure. Piperazine is a common cyclic diamine where both nitrogen atoms are of the secondary type and part of the heterocyclic ring.

Another modification to reduce the Tg of the polyamide soft segments is to use at least one additional monomer beyond the minimum number of monomers to form the polyamide. Thus, for a polyamide formed from a lactam polymerization such as from N-methyl-dodecyl lactam, one would include an additional lactam, aminocarboxylic acid, diamine, or dicarboxylic acid in the monomers for the polymerization to change the spacing (among repeat units) between the amide linkages formed by the monomer so that the spacing between the amide linkages in the polyamide is irregular along the backbone and not the same physical dimension. For a polymerization of aminocarboxylic acid one would include additional lactam, aminocarboxylic acid, diamine, or dicarboxylic acid (with different physical length between the primary reactive groups of the monomer) in the monomer blend for the polymerization to change the spacing among repeat units between the amide linkages. Switching end groups on the monomers can also disrupt regularity in the spacing of the polar amide linkages and lower the effective Tg of the copolymer. Thus co-polymerizing a $C_6$ amino carboxylic acid or lactam with a $C_6$ diacid and $C_6$ diamine can disrupt regularity of the amide linkages as the diacid and diamine units would switch the orientation of the amide linkage from head to tail orientation to tail to head orientation, slightly disrupting uniformity of spacing of the amide linkages along the polyamide backbone. Typically, when following this procedure one would try to add a disrupting monomer that increased or decreased the number of atoms between the amide forming end groups of the monomer(s) used as the primary monomer in the polyamide. One could also use a second disrupting monomer that had a cyclic structure (such as piperazine, a cyclic diamine monomer with where two methylene atoms form the top half of the ring and two methylene atoms form the bottom half of the ring) to disrupt the regularity of polyamide formed from a diacid reacted with a diamine monomer with two methylene atoms between the nitrogen atoms of the diamine. Also to reduce the Tg one could use polyamide forming monomers with bulky side groups (examples of this type of monomer include dimer acids).

Another way to express the use of a copolymerization method to reduce the Tg and consequently the hardness of the polyamide is that the polyamide is characterized as being within a, b or c a) when said amide linkages are derived from polymerizing one or more monomers and more than 90 mole % of said monomers are derived from polymerizing monomers selected from lactam and aminocarboxylic acid monomer then said polyamide is defined as a copolymer of at least two different monomers, meaning said monomers are characterized as being at least two different monomers because they have hydrocarbyl portion of different spacing length between the amine and carboxylic acid groups, wherein each of said at least two different monomers is present at molar concentrations of at least 10%, more desirably at least 20 or 30%, of the total lactam and/or aminocarboxylic acid monomers in said polyamide, or b) when said amide linkages are derived from polymerizing two or more monomers and more than 90 mole % of said monomers were derived from polymerizing dicarboxylic acid and diamine monomers then said polyamide is defined as a terpolymer of at least three different monomers (meaning said amide linkages are formed from at least three different monomers selected from the group of dicarboxylic acid and diamine monomers wherein said at least three different monomers are characterized as different from each other by a hydrocarbyl group of different spacing length between the carboxylic acid groups of the dicarboxylic acid, or different spacing length between the amine groups of the diamine, wherein each of said at least three different monomers is present at concentrations of at least 10 mole %, more desirably at least 20 or 30 mole %, of the total monomers in said polyamide), or c) with the proviso that if said amide linkages are derived from polymerizing a combination of dicarboxylic acid, diamine and either lactam and/or aminocarboxylic acid monomers such that the total dicarboxylic acid monomer(s) and the diamine monomer(s) are present at 10 mole % or more, more desirably 20 or 30 mole % or more, and the total lactam and aminocarboxylic acid monomers are present in the monomer blend at 10 mole % or more, more desirably 20 or 30 mole % or more, then there are no restrictions requiring additional different monomers.

We use the term low Tg, glass transition temperature, even though we realize most of the polyamide segments are initially low molecular weight and it would not be easily possible to measure the Tg of the low molecular weight oligomers, e.g. the measured value would be dramatically affected by molecular weight. High Tg polymers, e.g. having Tg values above 70, 80, or 90° C. as measured by differential scanning calorimetry (DSC), would tend to form solids or gels even at low molecular weights. Thus, the polyamide oligomers, telechelic polyamides, and even the prepolymers from telechelic polyamides or polyamide oligomers are often described in this specification by their viscosity at specific temperatures. Low Tg polyamide oligomers will be defined as those compositions that would have Tg, if above 20,000 g/mole molecular weight, of below 50, 25, or 0° C.

In one embodiment, the telechelic prepolymer will have a viscosity measured by a Brookfield circular disc viscometer with the circular disc spinning at 5 rpm of less than 100,000 cps at a temperature of 70° C., more desirably less than 15,000 or 10,000 cps at 70° C., still more desirably less than 100,000 cps at 60° C., and more preferably less than 15,000 or 10,000 cps at 60° C.; and still more preferable less than 15,000 or 10,000 cps at 50° C. Preferably, these viscosities are neat prepolymers without solvents or plasticizers. These types of viscosities will facilitate dispersing the prepolymer as fine droplets in a continuous media to form a colloidally stable dispersion. In some embodiments, the telechelic prepolymer can be diluted with solvent or plasticizers to achieve viscosities in these ranges.

The term polyamide oligomer will refer to an oligomer with two or more amide linkages, or sometimes the amount of amide linkages will be specified. A subset of polyamide oligomers will be telechelic polyamides. Telechelic polyamides will be polyamide oligomers with high percentages, or specified percentages, of two functional groups of a single chemical type, e.g. two terminal amine groups (meaning either primary, secondary, or mixtures), two terminal carboxyl groups, two terminal hydroxyl groups (again meaning primary, secondary, or mixtures), or two terminal isocyanate groups (meaning aliphatic, aromatic, or mixtures). Ranges for the percent difunctional that are preferred to meet the definition of telechelic are at least 70 or 80, more desirably at least 90 or 95 mole % of the oligomers being difunctional as opposed to higher or lower functionality. Reactive amine terminated telechelic polyamides will be telechelic polyamide oligomers where the terminal groups are both amine types, either primary or secondary and mixtures thereof, i.e., excluding tertiary amine groups.

Many of the oligomers, telechelics, and polymers of this specification are made by condensation reactions of reactive groups on desired monomer(s). The condensation reaction of reactive groups will be defined as creating chemical linkages between the monomers. The portion of the monomer that is incorporated into the oligomer or polymer will be defined as the repeat unit from the particular monomer. Some monomers, such as aminocarboxylic acid, or one end of diacid reacting with one end of a diamine, lose one molecule of water as the monomer goes from a monomer to a repeat unit of a polymer. Other monomers, such as lactams, isocyanates, amines reacted with isocyanates, amines reacted with anhydrides, hydroxyl groups reacted with isocyanates, etc., do not release a portion of the molecule to the environment but rather retain all of the monomer in the resulting polymer.

We will define polyamide oligomer as a species below 40,000 or 50,000 g/mole number average molecular weight, e.g. often below 20,000 or 30,000 g/mole, that have about two or more amide linkages per oligomer. These polyamides will have number average molecular weight above 500, 1000, or 2000 g/mole. They will have ranges of molecular weight from about 500 or 1000 to 40,000 or 50,000 g/mole, more desirably from about 1000 or 2000 to about 20,000 or 30,000 g/mole. Later we will define preferred percentages of amide linkages or monomers that provide on average one amide linkage per repeat unit in various oligomeric species. A subset of polyamide oligomer will be telechelic oligomer. The telechelic polyamide has molecular weight preferences identical to the polyamide oligomer above. The term telechelic has been defined earlier. Multiple polyamide oligomers or telechelic polyamides can be linked with condensation reactions to form polymers, generally above 100,000 g/mole.

Generally, amide linkages are formed from the reaction of a carboxylic acid group with an amine group or the ring opening polymerization of a lactam, e.g., where an amide linkage in a ring structure is converted to an amide linkage in a polymer. Alternatively, amide bonds can be formed at lower temperatures by reacting amines with anhydrides. In a preferred embodiment, a large portion of the amine groups of the monomers are secondary amine groups or the nitrogen of the lactam is a tertiary amide group. Secondary amine groups form tertiary amide groups when the amine group reacts with carboxylic acid to form an amide. For the purposes of this disclosure, the carbonyl group of an amide, e.g., in a lactam, will be considered as derived from a carboxylic acid group because the amide linkage of a lactam is formed from the reaction of carboxylic group of an aminocarboxylic acid with the amine group of the same aminocarboxylic acid. The formation of amides from the reaction of carboxylic acid groups and amine groups can be catalyzed by boric acid, boric acid esters, boranes, phosphorous acid, phosphates, phosphate esters, amines, acids, bases, silicates, and silsesquioxanes. Additional catalysts, conditions, etc., are available in textbooks such as "Comprehensive Organic Transformations" by Larock.

The polyamide oligomers and telechelic polyamides of this disclosure can contain small amounts of ester linkages, ether linkages, urethane linkages, urea linkages, etc., if the additional monomers used to form these linkages are useful to the intended use of the polymers. This allows other monomers and oligomers to be included in the polyamide to provide specific properties, which might be necessary and not achievable with a 100% polyamide segment oligomer. Sometimes added polyether, polyester, or polycarbonate provides softer, e.g. lower Tg, segments. Sometimes it is desirable to convert the carboxylic end groups or primary or secondary amine end groups of a polyamide to other functional end groups capable of condensation polymerizations. Sometimes an initiator for oligomer chain polymerization of a lactam is used that doesn't generate an amide linkage. Sometimes a polyether might be used as a segment or portion of a polyamide to reduce the Tg, or provide a soft segment, of the resulting polyamide oligomer. Sometimes a polyamide segment, e.g. difunctional with carboxylic acid or amine terminal groups, can be functionalized with two polyether end segments, e.g. from Jeffamine™ D230, to further lower the Tg of, or provide a soft segment in, the polyamide oligomer and create a telechelic polyamide with amine or hydroxyl end groups.

As earlier indicated many amide forming monomers create on average one amide linkage per repeat unit. These include diacids and diamines when reacted with each other, aminocarboxylic acids, and lactams. When we discuss these monomers or repeat units from these monomers we generally mean these monomers, their repeat units and their reactive equivalents (meaning monomers that generate the same repeat unit as the named monomer). These reactive equivalents might include anhydride of diacids, esters of diacids, etc. These monomers, when reacted with other monomers in the same group, also create amide linkages at both ends of the repeat units formed. Thus, we will use both mole percentages of amide linkages and weight percentages of amide forming monomers. Amide forming monomers will be used to refer to monomers that form on average one amide linkage per repeat unit in normal amide forming condensation linking reactions.

In one embodiment, desirably at least 10 mole %, more desirable at least 25, 30, 45, 50, 55, more desirably at least 60, 70, 75, 76, 80, 90, or 95 mole % of the number of the heteroatom containing linkages connecting hydrocarbon type linkages in the polyamide oligomer or telechelic polyamide are characterized as being amide linkages. Heteroatom linkages are linkages such as amide, ester, urethane, urea, ether linkages, where a heteroatom connects two portions of an oligomer or polymer that are generally characterized as hydrocarbons (or having carbon to carbon bond, such as hydrocarbon linkages). As the amount of amide linkages in the polyamide increase the amount of repeat units from amide forming monomers in the polyamide increases.

In one embodiment, desirably at least 25 wt. %, more desirable at least 30, 40, 50, more desirably at least 60, 70, 80, 90, or 95 wt. % of the polyamide oligomer or telechelic polyamide is repeat units from amide forming monomers, also identified as repeat units from monomers that form amide linkages at both ends of the repeat unit. Such monomers include lactams, aminocarboxylic acids, dicarboxylic acid, anhydrides of dicarboxylic acids, and diamines. In one embodiment, desirably at least 25 wt. %, more desirable at least 30, 40, or 50, more desirably at least 60, 70, 80, 90, or 95 wt. % of the polyamide oligomer or telechelic polyamide is tertiary amide forming monomers, also identified as repeat units from monomers that form tertiary amide linkages at the amine ends of the repeat unit. Such monomers include lactams with tertiary amide groups, aminocarboxylic acids with secondary amine groups, dicarboxylic acid and diamines where both amine terminal groups are secondary amines.

In one embodiment, desirably at least 50, 75, 76, 80, 90, or 95 mole percent of the number of the heteroatom containing linkages connecting hydrocarbon type linkages in the polyamide oligomer or telechelic polyamide are characterized as being tertiary amide linkages. In one embodiment, desirably at least 25, 50, 75, 76, 80, 90, or 95 mole percent of the linkages in the polyamide oligomer or telechelic polyamine are tertiary amide linkages. As earlier explained tertiary amide linkages result from ring opening polymerization of lactams with tertiary amides or reactions of secondary amines with carboxylic acid groups.

Calculation of Tertiary Amide Linkage %:

The % of tertiary amide linkages of the total number of amide linkages was calculated with the following equation:

$$\text{Tertiary amide linkage \%} = \frac{\sum_{i=1}^{n}(w_{tertN,i} \times n_i)}{\sum_{i=1}^{n}(w_{totalN,i} \times n_i)} \times 100$$

where n is the number of monomers,
the index i refers to a certain monomer,
$w_{tertN}$ is the average number nitrogen atoms in a monomer that form or are part of tertiary amide linkages in the polymerizations, (note: end-group forming amines do not form amide groups during the polymerizations and their amounts are excluded from $w_{tertN}$),
$w_{totalN}$ is the average number nitrogen atoms in a monomer that form or are part of tertiary amide linkages in the polymerizations (note: the end-group forming amines do not form amide groups during the polymerizations and their amounts are excluded from $w_{totalN}$), and $n_i$ is the number of moles of the monomer with the index i.

Calculation of Amide Linkage %:

The % of amide linkages of the total number of all heteroatom containing linkages (connecting hydrocarbon linkages) was calculated by the following equation:

$$\text{Amide linkage \%} = \frac{\sum_{i=1}^{n}(w_{totalN,i} \times n_i)}{\sum_{i=1}^{n}(w_{totalS,i} \times n_i)} \times 100$$

where $w_{totalS}$ is the sum of the average number of heteroatom containing linkages (connecting hydrocarbon linkages) in a monomer and the number of heteroatom containing linkages (connecting hydrocarbon linkages) forming from that monomer polymerizations. "Hydrocarbon linkages" are just the hydrocarbon portion of each repeat unit formed from continuous carbon to carbon bonds (i.e., without heteroatoms such as nitrogen or oxygen) in a repeat unit. This hydrocarbon portion would be the ethylene or propylene portion of ethylene oxide or propylene oxide; the undecyl group of dodecyllactam, the ethylene group of ethylenediamine, and the $(CH_2)_4$ (or butylene) group of adipic acid.

Preferred amide or tertiary amide forming monomers include dicarboxylic acids, anhydrides, dianhydrides, diamines, aminocarboxylic acids and lactams. Preferred dicarboxylic acids are where the alkylene portion of the dicarboxylic acid is a cyclic, linear, or branched (optionally including aromatic groups) alkylene of 2 to 36 carbon atoms, optionally including up to 1 heteroatom per 3 or 10 carbon atoms, more preferably from 4 to 36 carbon atoms (the diacid would include 2 more carbon atoms than the alkylene portion. These include dimer fatty acids (e.g. dimerized tall oil), hydrogenated dimer acid, sebacic acid, etc. Generally, we prefer diacids with larger alkylene groups as this generally provides polyamide repeat units with lower Tg value.). In some embodiments these dicarboxylic acids can be oligomeric species up to 4000, 5000, or 6000 g/mole number average molecular weights. Examples of oligomeric polyacid or polyanhydrides include maleated polybutadiene and maleated triglyceride oils (e.g. maleated soybean, linseed, etc. oil).

Preferred diamines include those with up to 60 carbon atoms, optionally including 1 heteroatom (besides the two nitrogen atoms) for each 3 or 10 carbon atoms of the diamine and optionally including a variety of cyclic, aromatic or heterocyclic groups providing that one or both of the amine groups are secondary amines, a preferred formula is

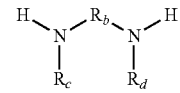

wherein $R_b$ is a direct bond or a linear or branched (optionally being or including cyclic, heterocyclic, or aromatic portion(s)) alkylene group (optionally containing up to 1 or 3 heteroatoms per 10 carbon atoms of the diamine) of 2 to 36 carbon atoms and more preferably 2 or 4 to 12 carbon atoms and $R_c$ and $R_d$ are individually a linear or branched alkyl group of 1 to 8 carbon atoms, more preferably 1 or 2 to 4 carbon atoms or $R_c$ and $R_d$ connect together to form a single linear or branched alkylene group of 1 to 8 carbon atoms or optionally with one of $R_c$ and $R_d$ is connected to $R_b$ at a carbon atom, more desirably $R_c$ and $R_d$ being 1 or 2 to 4 carbon atoms. Such diamines include Ethacure™ 90 from Albermarle (supposedly a N,N'-bis(1,2,2-trimethylpropyl)-1,6-hexanediamine); Clearlink™ 1000 or Jefflink™ 754 both from Huntsman; N-methylaminoethanol; dihydroxy terminated, hydroxyl and amine terminated or diamine terminated poly(alkyleneoxide) where the alkylene has from 2 to 4 carbon atoms and having molecular weights from 100 to 2000; N,N'-diisopropyl-1,6-hexanediamine; N,N'-di(sec-butyl) phenylenediamine; piperazine; homopiperazine; and methyl-piperazine. Jefflink™ 754 has the structure

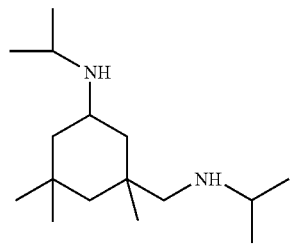 [SMILES: CC(C)NCC1(C)CC(NC(C)C)CC(C)(C)C1]

Clearlink™ 1000 has the structure

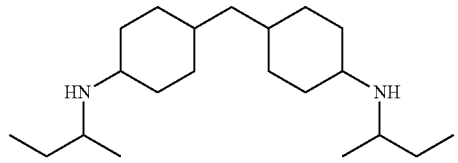 [SMILES: CCC(C)NC1CCC(CC2CCC(NC(C)CC)CC2)CC1]

Another diamine with an aromatic group is: N,N'-di(sec-butyl) phenylenediamine, see structure below:

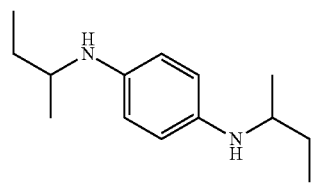 [SMILES: CCC(C)Nc1ccc(NC(C)CC)cc1]

Preferred diamines are diamines wherein both amine groups are secondary amines.

Preferred lactams include straight chain or branched alkylene segments therein of 4 to 12 carbon atoms such that the ring structure, without substituents on the nitrogen of the lactam, has 5 to 13 carbon atoms total (when one includes the carbonyl) and the substituent on the nitrogen of the lactam (if the lactam is a tertiary amide) is an alkyl of from 1 to 8 carbon atoms and more desirably an alkyl of 1 to 4 carbon atoms. Dodecyl lactam, alkyl substituted dodecyl lactam, caprolactam, alkyl substituted caprolactam, and other lactams with larger alkylene groups are preferred lactams as they provide repeat units with lower Tg values. Aminocarboxylic acids have the same number of carbon atoms as the lactams. Desirably, the number of carbon atoms in the linear or branched alkylene group between the amine and carboxylic acid group of the aminocarboxylic acid is from 4 to 12 and the substituent on the nitrogen of the amine group (if it is a secondary amine group) is an alkyl group with from 1 to 8 carbon atoms, more preferably 1 or 2 to 4 carbon atoms. Aminocarboxylic acids with secondary amine groups are preferred.

In one embodiment, desirably at least 50 wt. %, more desirably at least 60, 70, 80 or 90 wt. % of said polyamide oligomer or telechelic polyamide comprise repeat units from diacids and diamines of the structure of the repeat unit being

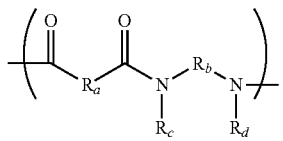

wherein $R_a$ is the alkylene portion of the dicarboxylic acid and is a cyclic, linear, or branched (optionally including aromatic groups) alkylene of 2 to 36 carbon atoms, optionally including up to 1 heteroatom per 3 or 10 carbon atoms of the diacid, more preferably from 4 to 36 carbon atoms (the diacid would include 2 more carbon atoms than the alkylene portion) and wherein $R_b$ is a direct bond or a linear or branched (optionally being or including cyclic, heterocyclic, or aromatic portion(s)) alkylene group (optionally containing up to 1 or 3 heteroatoms per 10 carbon atoms) of 2 to 36 or 60 carbon atoms and more preferably 2 or 4 to 12 carbon atoms and $R_c$ and $R_d$ are individually a linear or branched alkyl group of 1 to 8 carbon atoms, more preferably 1 or 2 to 4 carbon atoms or $R_c$ and $R_d$ connect together to form a single linear or branched alkylene group of 1 to 8 carbon atoms or optionally with one of $R_c$ and $R_d$ is connected to $R_b$ at a carbon atom, more desirably $R_c$ and $R_d$ being an alkyl group of 1 or 2 to 4 carbon atoms.

In one embodiment, desirably at least 50 wt. %, more desirably at least 60, 70, 80 or 90 wt. % of said polyamide oligomer or telechelic polyamide comprise repeat unit units from lactams or amino carboxylic acids of the structure

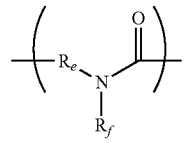

Repeat units can be in a variety of orientations depending on initiator type in the oligomer, derived from lactams or amino carboxylic acid wherein each $R_e$ independently is linear or branched alkylene of 4 to 12 carbon atoms and each $R_f$ independently is a linear or branched alkyl of 1 to 8 (more desirably 1 to 4) carbon atoms.

The above described polyamide oligomers and telechelic polyamide are useful to make prepolymer dispersions in water. These dispersions of polyamide prepolymers can be chain extended by reaction with a polyfunctional reactant capable of forming a covalent bond with an amine terminal group (e.g. capable of reacting with a primary or secondary amine). This polyfunctional reactant could be a polyisocyanates to form urea linkages (forming a polyurea), a polyepoxide, a polyacrylate, a polyacetonacetonate, a vinyl silane (e.g. acrylate silate), or an epoxy silane to form chain extended polymer. Polyisocyanates will be used in this specification to refer to isocyanate containing species having two or more isocyanates groups per molecule.

The molecular weight of the polyamide prepolymer can be increased (or it is sometimes referred to as chain extending the prepolymer into a polyurea polymer) after the dispersion of prepolymer is made.

Dispersing species such as surface active species with anionic, cationic, nonionic, or zwitterionic groups are desirably added to the prepolymer (or polymer) if it is desired to disperse the prepolymer (or polymer) in a continuous aqueous phase. These dispersing species help to provide colloidal stabilization to the dispersed phase. If surface active dispersing groups are to be incorporated into the polymer, it is desirable to include them in the reaction of the polyamide oligomer or telechelic polyamide (e.g. during the prepolymer preparation). The polycarboxylic acid or anhydride thereof species previously discussed is the preferred mechanism to add anionic dispersing groups to the prepolymers.

Polyamides are generally hydrophobic and not inherently water-dispersible. Therefore, at least one water-dispersability enhancing compound, i.e. a monomer with a dispersing functionality, which has at least one, hydrophilic, ionic or potentially ionic group is optionally included in the reactants for the polyamide prepolymers of this invention to assist dispersion of the prepolymer in water. Typically, this is done by incorporating a compound bearing at least one hydrophilic group or a group that can be made hydrophilic, e.g., by chemical modifications such as neutralization, into the polymer/prepolymer chain. These compounds may be of a nonionic, anionic, or zwitterionic nature or the combination thereof. For example, anionic carboxylic acids groups from the polycarboxylic reactant, after being incorporated into the prepolymer, can be ionized by a salt-forming compound, such as a tertiary amine or other base (e.g. NaOH, KOH, etc.) defined more fully hereinafter. Anionic dispersible polyamide prepolymers based on carboxylic acid groups generally have an acid number from about 1 to about 60 mgKOH/gram, typically 1 to about 40, or even 10 to 35 or 12 to 30 or 14 to 25 mg KOH/gram. Other water-dispersibility enhancing compounds can also be reacted into the prepolymer, including lateral or terminal hydrophilic poly (ethylene oxide), poly(propylene oxide), copolymers of ethylene oxide and propylene oxide, or ureido units.

Another group of water-dispersibility enhancing compounds of particular interest are side chain hydrophilic monomers. Some examples include alkylene oxide polymers and copolymers in which the alkylene oxide groups have from 2-10 carbon atoms as shown, for example, in U.S. Pat. No. 6,897,281, the disclosure of which is incorporated herein by reference.

(i) Polyisocyanate

Suitable polyisocyanates have an average of about two or more isocyanate groups, preferably an average of about two to about four isocyanate groups per molecule and include aliphatic, cycloaliphatic, araliphatic, aromatic, and heterocyclic polyisocyanates, as well as products of their oligomerization, used alone or in mixtures of two or more. Diisocyanates are more preferred.

Specific examples of suitable aliphatic polyisocyanates include alpha, omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, and the like. Polyisocyanates having fewer than 5 carbon atoms can be used but are less preferred because of their high volatility and toxicity. Preferred aliphatic polyisocyanates include hexamethylene-1,6-diisocyanate, 2,2,4-trimethyl-hexamethylene-diisocyanate, and 2,4,4-trimethyl-hexamethylene diisocyanate.

Specific examples of suitable cycloaliphatic polyisocyanates include dicyclohexylmethane diisocyanate, (commercially available as Desmodur™ W from Bayer Corporation), isophorone diisocyanate, 1,4-cyclohexane diisocyanate, 1,3-bis-(isocyanatomethyl) cyclohexane, and the like. Preferred cycloaliphatic polyisocyanates include dicyclohexylmethane diisocyanate and isophorone diisocyanate.

Specific examples of suitable araliphatic polyisocyanates include m-tetramethyl xylylene diisocyanate, p-tetramethyl xylylene diisocyanate, 1,4-xylylene diisocyanate, 1,3-xylylene diisocyanate, and the like. A preferred araliphatic polyisocyanate is tetramethyl xylylene diisocyanate.

Examples of suitable aromatic polyisocyanates include 4,4'-diphenylmethylene diisocyanate, toluene diisocyanate, their isomers, naphthalene diisocyanate, and the like. Preferred aromatic polyisocyanates include 4,4'-diphenylmethylene diisocyanate and toluene diisocyanate.

Examples of suitable heterocyclic isocyanates include 5,5'-methylenebisfurfuryl isocyanate and 5,5'-isopropylidenebisfurfuryl isocyanate.

Polyamide-based polyurea/urethane compositions were made in waterborne dispersion form with high molecular weight, e.g. Mw>80 000 g/mol, high solid content, e.g. 25-40 wt. %, various particle size, e.g. 40-200 nm. The dispersions were made with NMP, N-methylpyrrolidone, solvent, e.g. 0-11% in formulation, or with solvent process (NMP-free method) using IPA.

Good quality, clear, colorless (or very faint yellow color) polyurea and or polyurethane with polyamide segment in the form of films formed from the dispersion. The films had high tensile strength, e.g. 35,000-55,000 psi, moderate elongation, e.g., 250-300%, films.

We made a series of polyamide oligomers from conventional difunctional acids and amines. These oligomers contained amine terminations and in reaction with diisocyanates form polyamide-polyurea backbone. The polyamide building blocks in our new dispersion polymers provide excellent hydrolytic stability, superior heat and UV resistance, and better overall mechanical properties in comparison to polyester and polyether segments. In addition, the amine chain termination in these polyamide oligomers forms urea linkages (vs. urethane link from polyol) in reaction with isocyanates. These polyurea linkages are known to have stronger intermolecular attractions that act more like a true crosslinked polymer, resulting in performance advantages over urethanes, including but not limited to better solvent resistance and elasticity.

Conventional Blends with Other Polymers

The dispersions of this invention can be combined with compatible polymers and polymer dispersions by methods well known to those skilled in the art. Such polymers, polymer solutions, and dispersions include those described in A. S. Teot. "Resins, Water-Soluble" in: Kirk-Othmer Encyclopedia of Chemical Technology. John Wiley & Sons. 3rd Edn., Vol. 20, H. F. Mark et al. Eds., pp. 207-230 (1982).

Composite Polymer Compositions (e.g., Polyurea/Urethane with Free Radically Polymerizable Monomers) Providing Better Interpenetration of Phases In this embodiment, one can use ethylenically unsaturated monomer(s) as a solvent to reduce the viscosity of the prepolymer during preparation and dispersion of the prepolymer or polyurea/urethane and subsequently polymerize the unsaturated monomer(s) to form a polymer. Ethylenically unsaturated monomers and other free radically polymerizable monomers can be polymerized by conventional free radical sources to form a polymer within the polyurea/urethane particle to form a composite polymer with the polyurea/urethane polyamide of the dispersion. Vinyl polymers is a generic term for polymers derived from substantial portions of unsaturated monomers or polymers derived from those monomers. Acrylic, often considered a subset of vinyl, will refer to acrylic acid, acrylates, being esters of acrylic acid, and alkacrylates, such as methacrylates and ethacrylates, and polymers therefrom. Additional free-radically polymerizable material, e.g., other unsaturated monomers, may be added to the vinyl or acrylic monomers to copolymerize. These other monomers can be monomers such as maleic anhydride, maleic acid, and other monomers where the carbon-carbon double bond is nearly as reactive (and copolymerizable with) as a ethylenically unsaturated monomers. Vinyl esters ($C_1$-$C_{15}$ esters such as vinyl acetate) may be used. Vinyl aromatic monomers such as styrene, various methyl-styrenes, divinyl benzene, etc. may be used. Polyacrylates from acrylic or methacrylic acid reacted with $C_1$-$C_{10}$ polyols may also be used to provide crosslinking. Dienes are considered ethylenically unsaturated and copolymerize with both the broad category of vinyl monomers and narrow category of acrylic monomers.

The polymerization within the polyurethane particles can be done by forming the aqueous dispersions of polyurea/urethane composite and then polymerizing additional monomers by emulsion or suspension polymerization in the presence of these dispersions. Another way of making composite polymers is to include ethylenically unsaturated monomers in the polyurea/urethane prepolymer, e.g., either with the reactants to form the prepolymer and/or any time before the urethane prepolymer is dispersed, and cause these monomer to polymerize before, during and/or after the prepolymer is dispersed in aqueous medium. In one embodiment, the weight percent of polymer(s) from vinyl monomers based on 100 parts of combined urea/urethane and vinyl (or acrylic in narrower embodiments) will be at least 1, 5, or 10 weight percent with the complementary amount of urea/urethane prepolymer or polymer to make 100 parts by weight total. In another embodiment, where small amounts of urea/urethane prepolymer or polymer are desired, the urea/urethane prepolymer or polymer is at least 0.1, 0.5, 1, 5 or 10 weight percent of the combined weight and the vinyl (or acrylic in narrower embodiments) polymer is the complementary amount. In one approach, the ethylenically unsaturated monomers act as a diluent (or plasticizer) during prepolymer formation. When the vinyl monomers are used as a diluent for the polyurea/urethane component then the vinyl monomers will be from about 5 or 10 weight percent to about 50 weight percent of the combined weight of the polyurea/urethane with the vinyl component (monomer or polymer, depending on whether polymerization has occurred or not).

Broadened definition of Composite and/or Hybrid Polymer in Dispersion in Water As composite and/or hybrid polymers dispersed in aqueous media (water) with significant amounts of polyamide segments therein have not be extensively disclosed in the literature and said composite and/or hybrid polymers can have desirable lower film formation temperature, better adhesion to some polar substrates, better elongation to break, better tensile strength, better retention of properties after aging, etc. than current urethane and/or polyamide compositions on the market. Composites and/or hybrid compositions can allow one to adjust the weight percentage of polyamide repeat units relative to other repeat units (e.g. optionally polyether, polycarbonate, polyester segments, polysiloxane, etc.) in the condensation polymer to optimize the modulus at a particular temperature or to move the minimum film formation temperature up or down by adding softer or harder polymer segments relative to the polyamide. Condensation polymer is a generic term for polymers made by coupling reactive groups like amine, carboxylic acid, isocyanates, hydroxyl, etc., in to form chemical bonds (as opposed to free radical chain polymerizations). Composite and/or hybrid compositions also allow adjustment of the weight percentage of polyamide by increasing the weight percentage of vinyl polymer without increasing the amount of polyamide. Thus, this technology provides several ways to independently control the amount of polyamide in the composite particles, which can have effects on the polarity or hydrogen bonding of the composite particles, the surface tension of the composite particles, and/or the modulus, tensile strength, etc. of the composite polymer at a particular key temperature.

By the term composite and/or hybrid we intend to include a variety of mixtures of other polymers with a polyamide rich polymer type. A focus of this disclosure is ways to add polyamide segments to a polymer dispersion in water such that desirable features of polyamide can be achieved without some detrimental features such as high polymer processing temperatures. The polymers that contain polyamide segments may have other comonomers or comonomer segments linked directly or indirectly to the polyamide segments. These comonomers can include things like polyethers, polyesters, polycarbonates, polysiloxanes, etc. The composite and/or hybrid polymers of the composite and/or hybrid dispersions have approximately the same particle size ranges as disclosed for the polyamide dispersions in water.

The composite and/or hybrid polymer dispersions may have within the polymer comprising polyamide segments anionic, nonionic, or zwitterionic colloidal stabilizing groups as earlier disclosed for the polyamide dispersions in water.

In one embodiment, we disclose a composite and/or hybrid polymer dispersion in the form of dispersed hybrid polymer particles in aqueous medium, said composite and/or hybrid polymer dispersion comprising at least 5 wt. % (in some embodiments more desirably at least 10, 15, 20, 30 or 40 wt. %) of polyamide segments derived from amide forming condensation polymerization of monomers selected from diamines, amino carboxylic acids, lactams, and dicarboxylic acids, said wt. % based on the weight of said hybrid polymer dispersion in aqueous medium, said polyamide segments characterized as the entire weight of repeat units from said monomers having terminal amide linkage(s) at one or both ends of repeat units from said monomers. In a more preferred embodiment said amide linkages are characterized as being at least 50, 70, 90, or 95 mole % amides linkages of the type formed from the reaction of a secondary amine with a carboxylic acid (i.e. a tertiary amide linkage). We note that lactam monomers forming tertiary amide linkages start out as tertiary amide linkages, ring open, and then form polymers with tertiary amide linkages. We intend the above language regard amide linkage of the type formed from secondary amines reacted with carboxylic acid to include those derived from lactams with tertiary amide linkages.

The composite particles also comprise at least 5 wt. % (in some embodiments more desirably at least 10, 15, 20, 30 or 40 wt. %) of a vinyl polymer interspersed with said polyamide segments within the same polymer particles as said polyamide segments, wherein said vinyl polymer is derived from the free radical polymerization of one or more vinyl monomers in the presence of said polyamide segments (vinyl monomers being defined in this context as having at least alpha-beta unsaturation and desirably having from 3 to about 30 carbon atoms, including but not limited to (alk) acrylates, vinyl esters, unsaturated amides, acrylonitrile, dienes, styrene, AMPS monomer, etc.), and water. The water can be present in amounts from about 10, 20, or 30 weight percent of the polymer dispersion to about 70, 80, or 90 wt. % of the polymer dispersion. Typically, lower water content saves on shipping costs for the same amount of polymer but viscosity of the dispersions tend to rise when the water content is minimized.

In one embodiment, it is desirable that the polymer containing the polyamide segments be partially crosslinked to increase the physical properties of the polymer such as tensile strength and modulus. Use of ketone functionality in the polyamide prepolymer is one desirable method for crosslinking polymers, particularly waterborne type polymers. In one embodiment, the amount of ketone crosslinkable functional groups in the composite or hybrid polymer will be at least 0.05 milliequivalents per gram of said polymer dispersion, or up to about 1 milliequivalent, preferably from about 0.05 to about 0.5 milliequivalent, and more preferably from about 0.1 to about 0.3 milliequivalent per gram of said polymer dispersion. In that embodiment, the ketone groups can be on the polyamide containing polymer or the vinyl polymer. In another embodiment, said composite or hybrid polymer dispersion has at least 10, 20, 30, 40 or 50 wt. % of said polyamide segments chemically bonded into polymers comprising on average one or more ketone groups per said polymer. In another embodiment, said polymer dispersion further comprises hydrazine and/or hydrazide groups (sometimes in the form of low molecular weight species and sometimes in the form of polymers with hydrazide groups) in an amount from 10 mole % to about 200 mole % of hydrazine and/or hydrazide groups based on the moles of said ketone groups. This provides for a ketone chemical reaction with hydrazine forming a chemical bond that can function as chemical crosslinking. Typically, when adding hydrazine for crosslinking one doesn't use an excess of hydrazine because of potential undesirable reactions of hydrazine on humans. In one embodiment, the amount of hydrazine or hydrazide groups is desirably from about 20 to 100 mole % of the amount of ketone functional groups.

In one embodiment, said hydrazine and/or hydrazide groups are part of a reactive hydrazine or hydrazide compound of less than 400, 300 or 220 g/mole molecular weight (such as adipic acid dihydrazide). In another embodiment, said hydrazide groups are present and said hydrazide groups are part of a hydrazide reactive oligomeric or polymeric chemical compound of 300 or 400 g/mole to 500,000 g/mole molecular weight.

In another embodiment, said vinyl polymer comprises on average one or more (more desirably up to about 1 milliequivalent, preferably from about 0.05 to about 0.5 milliequivalent, and more preferably from about 0.1 to about 0.3 milliequivalent per gram of vinyl polymer on a dry vinyl polymer weight basis) ketone groups per vinyl polymer and said dispersion further comprises hydrazine and/or hydrazide groups in an amount from 10 mole % to about 200 mole % based on the moles of said ketone groups.

The ketone-hydrazine crosslinking described above is well known in the urethane and acrylic polymer dispersion art as effective crosslinkers for polymeric dispersions at around room temperature upon evaporation of volatile base and shift of the solution pH from slightly basic to neutral or pH acid. The author Anthony D. Pajerski has several patents on urethanes and related compounds in water crosslinked or increased in molecular weight by ketone-hydrazine crosslinking. This technology is also sometimes known as azomethine linkages.

Air-oxidizable, self-crosslinkable (unsaturation) crosslinkers can also be conveyed into the polymer of the composite or hybrid dispersion. The self-crosslinkable groups can be inserted into the polymer backbone via active hydrogen containing (isocyanate-reactive) unsaturated fatty acid ester polyol(s) (e.g., oil modified polyols). The resulting unsaturation in the polymer imparts air curable latent crosslinkability so that when a coating composition containing such a component is dried in the air (often in conjunction with a drier salt as a catalyst) the coating undergoes a self-crosslinking reaction. By isocyanate reactive is meant that the unsaturated fatty acid polyol contains at least two hydroxyl groups (containing active hydrogen atoms) that are available for reaction with the isocyanate groups on the polyisocyanate. The oil modified polyols employed in the invention are conventional in the art. They are generally produced by reacting a polyfunctional alcohol (polyol) with a drying oil (glyceride) or a free fatty acid. The fatty acid component(s) of the drying oils and free fatty acids are characterized by containing at least one olefinic carbon-carbon double bond and can have two, three or more olefinic double bonds. The amount of unsaturated fatty acid ester polyol (or drying oil) to utilize will depend on many factors such as the degree of flexibility desired in the final composition and the nature and the amount of the other reactants used in the prepolymer formation as well as the degree and rate of air curing that is desired for the polymer.

Unsaturated fatty acid ester polyols also can be obtained by reacting an unsaturated fatty acid with an epoxy group containing compound. In one aspect of the invention the polyfunctional alcohols which can be used to prepare the oil modified polyols generally contain from 2 to about 12 carbon atoms. In another aspect of the invention, polyfunctional acids and acid anhydrides can be reacted with polyfunctional alcohols to obtain polyester polyols for use as a polyfunctional alcohol. Such acids and anhydrides useful in this aspect of the invention generally contain from 4 to about 36 carbon atoms. The unsaturated fatty acids which can be utilized in the preparation of the oil modified polyols of the invention include the ethylenically unsaturated and polyunsaturated fatty acids and their esters. The fatty acids can contain from 1 to about 3 olefinic double bonds or more and include conjugated and non-conjugated unsaturation. It is intended that the fatty acids encompass and include all natural and synthetic positional isomers with respect to the location of the unsaturated carbon-carbon double bonds. In another aspect of the invention, the fatty acids contain two to three unsaturated double bonds. The unsaturated fatty acids that can be employed in preparing the oil modified polyol include but are not limited to those formed by the hydrolysis of any of the so called drying or semidrying oils, such as linseed oil, poppyseed oil, tung oil, etc. Synthetically modified unsaturated fatty acids also can be employed in the preparation of the unsaturated fatty acid ester polyols of the invention. The properties of unsaturated fatty acids and their derivatives can be altered by rearrangement, i.e., isomerization, of the structure of the double bond, either with respect to the steric position or the position in the carbon chain of the molecule of the fatty acid.

The composite and/or hybrid polymer dispersion may further comprise from about 0.5 to about 10 wt. % of $C_1$ or $C_3$ to $C_{12}$ secondary alcohols based on the weight of said dispersion to function as simple hydrogen bonding donating components to the polyamide segments and soften or plasticize the composition (to enhance film formation at lower temperatures or lower viscosity during the dispersion process). The composite and/or hybrid polymer dispersion may also comprise alkylene oxide glycol ethers of less than 300 or 400 g/mole molecular weight in amounts of about 0.5 to about 10 wt. % of the polymer dispersion. The composite and/or hybrid polymer dispersion may also comprise anionic, nonionic, or zwitterionic surfactants to help colloidally stabilize the dispersion.

The composite and/or hybrid polymer dispersion may further comprising from about 1 to about 10 wt. % of a polysiloxane chemically bonded directly or indirectly to one or more of said polyamide segments. Polysiloxane polyols are characterized by the presence of the $—Si(R_1)(R_2)—O—$ repeat units which can contain $C_1$-$C_3$-alkyl or aryl groups such as polydimethylsiloxanes, poly(dimethysiloxane-co-diphenylsiloxane)s, polydiphenylsiloxanes, poly(methylphenyl)siloxanes and the like, and combinations thereof. Examples include ethoxylated poly(dimethylsiloxane) (PDMS) Y-17256 from Momentive Performance Materials and side-chain PDMS diol MCR-C61 from Gelest.

A composite and/or hybrid polymer dispersion according to earlier disclosures may further comprise urea and/or urethane linkages bonded directly or indirectly to one or more of said polyamide segments. This uses the polyamide segment (wherein a majority of amide linkages tertiary amide linkages as previously discussed) and the segments of polyamide are sometimes or often linked with urethane or urea linkages derived from reacting polyisocyanates with hydroxyl and/or amine groups. Thus, the polyamide segments would be chain extended by urethane or urea linkages. In one embodiment, where amine (primary or secondary) reactive groups are reacted with isocyanate groups, there are on average at least 4 urea linkages per every 20 amide linkages in said polymer. In another embodiment, where urethane linkages are preferred and made from reaction of hydroxyl terminated segments with isocyanate groups, there are on average at least 4 urethane linkages per every 20 amide linkages in said polyamide segments.

Processes

Aqueous dispersions of polyamide prepolymer are made in accordance with this invention by forming the polyamide prepolymer in the substantial absence of water (as water reacts with the amide linkages promoting de-polymerization) and then dispersing this prepolymer in aqueous medium. This can be done in any of the methods known to the art. Typically, prepolymer formation will be done by bulk or solution polymerizing the ingredients of the prepolymer.

Once the prepolymer is formed with dispersing moieties from the polycarboxylic acid incorporated into said prepolymer/polymer, it is dispersed in an aqueous medium to form a dispersion or a solution. An ionizing species for the carboxylic acid (such as a low molecular weight tertiary amine can be added to the prepolymer or dissolved in the water phase. Dispersing the prepolymer in aqueous medium can be done by any conventional technique in the same way that polyurethane prepolymers made by bulk or solution polymerization are dispersed in water. Normally, this will be done by combining the prepolymer blend with water with mixing. Where solvent polymerization is employed, the solvent and other volatile components can optionally be distilled off from the final dispersion, if desired. Where the prepolymer includes enough water-dispersibility enhancing compound, e.g. anionic and/or nonionic monomers, to form a stable dispersion without added emulsifiers (surfactants), the dispersion can be made without such compounds, i.e., substantially free of surfactants. Polyurea/urethane without low molecular weight surfactants exhibit less water sensitivity, often better film formation and less foaming.

Other known ways of making aqueous polyurethane dispersions can also be used to make the dispersions of this invention. Their review can be found in several publications including by D. Dieterich in *Progress in Organic Coatings*, vol. 9, pp. 281-340 (1981). Examples of the processes include:

Shear Mixing—Dispersing the prepolymer by shear forces with emulsifiers (external emulsifiers, such as surfactants, or internal emulsifiers having anionic, nonionic groups as part of or pendant to the polymer backbone, and/or as end groups on the polymer backbone).

Acetone process—A prepolymer is formed with or without the presence of acetone, MEK, and/or other polar solvents and easily distilled. The prepolymer is further diluted in said solvents as necessary, and chain extended with an active hydrogen-containing compound. Water is added to the chain-extended polymer, and the solvents are distilled off. A variation on this process would be to chain extend the prepolymer after its dispersion into water.

Continuous process polymerization—A polyamide prepolymer with anionic dispersing groups from said polycarboxylic acid formed. This prepolymer is pumped through high shear mixing head(s) and dispersed into water and then chain extended at said mixing head(s), or dispersed and chain extended simultaneously at said mixing head(s). This is accomplished by multiple streams consisting of prepolymer, ionizing agent, water, and optional chain extender and/or surfactant.

Reverse feed process—Water and ionizing agent(s) and/or chain extender are charged to the prepolymer under agitation. The prepolymer can be ionized before water and/or chain extender is added.

Additives and Applications

Because the polyamide and the urea linkages have higher softening temperatures than polyethers, polyesters, and urethane linkages, it is desirable to include coalescing aids in the prepolymers and polymer dispersions of this disclosure to help promote coalescence at the desired temperature of the polymer particles with each other and with any solid additives in the compositions. Coalescing aids can also be known as solvents or plasticizers, depending on their function. Coalescing solvents include diethylene glycol dimethyl ether, dipropylene glycol dimethyl ether, dimethylcarbonate, isopropyl alcohol, dibutylene glycol dimethyl ether, and Texanol (isobutyric ester of 2,2,4-trimethyl-1,3-pentanediol). Processing aids for the polyamide prepolymer include the vinyl monomers earlier discussed relative to composite polymer blends. These vinyl monomers can act as solvents prior to polymerization and reduce the viscosity of the prepolymer during the dispersing step. Preferred vinyl monomers include methyl methacrylate, butyl acrylate, ethylhexyl acrylate, ethyl acrylate and styrene.

Neutralization/ionization agents can optionally be employed in the dispersions of the invention and the coating compositions prepared from such dispersions. The pH of the anionic dispersions will typically range from about 7 to about 10. Suitable neutralization agents include but are not limited to alkali hydroxides such as lithium, sodium and potassium, and organic bases such as ammonia and tertiary amines such as triethanolamine, aminomethyl propanol, dimethyl ethanol amine, trimethyl amine, triethylamine morpholine, and mixtures thereof.

Crosslinkers

Compounds having at least one crosslinkable functional group can also be incorporated into the polyamide prepolymer of the present invention, if desired. Examples of such compounds include those having carboxylic, carbonyl, epoxy, acetoacetoxy, olefinic and hydrazide groups, blocked isocyanates, and the like, and mixtures of such groups and the same groups in protected forms which can be reversed back into original groups from which they were derived. Other suitable compounds providing crosslinkability include melamine and its derivatives, multivalent metal compounds and the like, and mixtures thereof.

The amount of optional compounds having crosslinkable functional groups in the prepolymer will typically be up to about 1 milli-equivalent, preferably from about 0.05 to about 0.5 milli-equivalent, and more preferably from about 0.1 to about 0.3 milli-equivalent per gram of final polyurethane on a dry weight basis.

Other additives well known to those skilled in the art can be used to aid in preparation of the dispersions of this invention. Such additives include surfactants, stabilizers, defoamers, thickeners, leveling agents, antimicrobial agents, antioxidants, UV absorbers, fire retardants, pigments, dyes, and the like. These additives can be added at any stage of the manufacturing process.

The dispersions of this invention typically have total solids of at least about 20 weight percent in one aspect, at least about 30 weight percent in another aspect, and at least about 40 weight percent in a further aspect, and about 45 weight percent in still another aspect, based on the weight of the total coating composition.

As coating compositions or adhesives, they may be applied to any substrate including wood, metals, glass, cloth, leather, paper, plastics, foam and the like, by any conventional method including brushing, dipping, flow coating, spraying, and the like.

The compositions of the present invention and their formulations are useful as self-supporting films, coatings on various substrates, or adhesives with longer useful lifetimes than similar polyurethane compositions or other improved properties.

WORKING EXAMPLES

Ricon™ 130MA8 is a maleated polybutadiene containing on average 2 anhydride groups per molecule and a number average molecular weight of about 3100. Dynasylan™ 1124 is a secondary amine containing two tri-methoxysilane substituents.

Example 1

Polyurethane-Acrylic Composite Waterborne Dispersion:

This example demonstrates how an NMP free water dispersible amide prepolymer could be prepared. Subsequent dispersion of the prepolymer and conversion of the acrylic monomers provides for a waterborne polyamide-polyacrylic composite (or hybrid) polymer.

A prepolymer was prepared by combining items 1 and 2 of the ingredients below at RT (~22° C.) to a 4 neck flask equipped with a thermometer, overhead stirrer and gas inlet. The reaction below was run under a stream of dry air introduced through the gas inlet on the reactor. The temperature of the reaction mixture was raised to 70° C. and held at this temperature for 1 hour. At this point item 3 was added and the mixture homogenized and held an additional 30 minutes at 70° C. or until the anhydride reaction was complete as indicated by the FTIR (peaks at about 1863 $cm^{-1}$ and 1786 $cm^{-1}$) of a small sample. At this point item 4-6 were added and homogenized into the resulting prepolymer.

TABLE 1

| Item # | Material | Parts g |
|---|---|---|
| 1 | Ricon 130MA8 | 150 |
| 2 | Dynasylan 1124 | 41.7 |
| 3 | TEA (triethanolamine) | 12.3 |
| 4 | Methyl methacrylate | 65.1 |
| 5 | 3-Methacryloxypropyltrimethoxysilane | 3.0 |
| 6 | BHT (butylated hydroxytoluene) | 0.1 |

A polyamide dispersion was prepared by dispersing 244.8 g of the (neutralized) prepolymer (viscosity ~1,100 cps at 70° C.) into 855 g of water. After allowing about 45 minutes of mixing, the temperature of the dispersion was adjusted to 33-35° C. and 0.5 parts of a 1% solution Fe-EDTA complex and 7.0 parts of aqueous 3.5% tert-butyl hydrogen peroxide were added followed by 10.5 parts of 2.0% aqueous erythorbic acid neutralized with triethylamine. The resulting exotherm indicated initiation and polymerization of the acrylic monomer present. This resulted in a 21 wt. % solids polyamide-acrylic composite dispersion with low sediment, a viscosity of 15 cps (at 25° C.) at a pH of 8.8 and a particle size of 37.4 nm. Coatings of the resulting dispersion dried to a tough tack free film at room temperature (e.g. 24° C.) without added co-solvent and show excellent water resistance after 24 hour cure time.

Example 2

Polyurethane-Acrylic Composite Waterborne Dispersion:

The above example uses the dispersion resulting from example 1. Using 200 g of the example 1 dispersion, 15.3 g of methyl methacrylate was added and allowed to homogenize into the waterborne polymer. The temperature of the dispersion was adjusted to 33-35° C. and 0.1 parts of a 1% solution Fe-EDTA complex and 3.0 parts of aqueous 3.5% tert-butyl hydrogen peroxide were added followed by 4.5 parts of 2.0% aqueous erythorbic acid neutralized with triethylamine resulting in a small exotherm from 35° C. to 40° C. from polymerization of the acrylic monomer. The over-polymerization of the additional acrylic monomer to the example 1 dispersion resulted in a 27.3 wt. % solids polyamide-acrylic composite dispersion with low sediment, a viscosity of 47 cps (at 25° C.) at a pH of 8.7 and a particle size of 82.3 nm.

Example 3

Maleated Natural Unsaturated Oil

This example demonstrates how a maleated natural oil could be prepared. In this particular example soybean oil is used as the poly-unsaturated oil; however, any oil that contains poly-unsaturation could be used such as linseed, dehydrated castor, sunflower oil, etc. The procedure below is adapted from patent WO2005071050 A1 where it is discussed in greater detail.

Mono-Maleated Soybean Oil Composition

| Raw Material | % w/w |
|---|---|
| Soybean oil (from Cargill) | 90.1 |
| Maleic anhydride | 9.9 |
| Toluene (optional) | 0.25 |

Procedure: Soybean oil is charged to a reaction vessel equipped with agitation and $N_2$ atmosphere and a condenser (for solvent reflux). Maleic anhydride is charged and the batch temperature is adjusted to 220° C. prior to holding for 4 hours (a small amount of toluene, 0.25% by weight, may be added to prevent maleic anhydride sublimation). Sample to lab after 4 hours for infrared analysis. Complete disappearance (or a very small shoulder) of peaks at 842 and 697 $cm^{-1}$ indicates completion of reaction—typically it is 4 hours but may need slightly longer.

Although a mono-maleated unsaturated oil is discussed, it is considered that higher degrees of maleation of the oil is possible depending on the degree of unsaturation. Typically, higher degrees of maleation are more difficult to achieve on unsaturated natural oils.

Example 4

Modified Oil Polyamide Waterborne Dispersion:

This example demonstrates how an NMP free water dispersible modified oil-amide prepolymer could be prepared. Subsequent dispersion of the prepolymer provides for an auto-oxidizable waterborne modified oil polyamide polymer.

A prepolymer was prepared by combining items 1 and 2 of the ingredients below at RT (~22° C.) to a 4 neck flask equipped with a thermometer, overhead stirrer and gas inlet. The reaction below was run under a stream of dry air introduced through the gas inlet on the reactor. The temperature of the reaction mixture was raised to 70° C. and held at this temperature for 1 hour. At this point item 3 was added and the mixture homogenized and held an additional 30 minutes at 70° C. or until the anhydride reaction was complete as indicated by the FTIR (peaks at about 1863 $cm^{-1}$ and 1786 $cm^{-1}$) of a small sample.

TABLE 3

| Item # | Material | Parts g |
|---|---|---|
| 1 | Maleated Soybean Oil (MSO) | 439 |
| 2 | Dynasylan 1124 | 147.3 |
| 3 | TEA (triethanolamine) | 39.2 |

A polyamide dispersion was prepared by dispersing 244.8 g of the (neutralized) prepolymer (viscosity ~1,100 cps at 70° C.) into 855 g of water. With the expected hydrolysis and partial condensation of the alkoxy silane groups, this resulted in a 21 wt. % solids modified oil polyamide dispersion with low sediment, a viscosity of 63 cps (at 25° C.) at a pH of 10.1 and a particle size of 102.7 nm. Coatings of the resulting dispersion dried to a tough tack free film at room temperature (e.g. 24° C.) without added co-solvent and show excellent water resistance after 24 hour cure time.

Example 5

Modified Oil Polyamide Waterborne Dispersion:

This example demonstrates how an NMP free water dispersible modified oil-amide prepolymer could be prepared. Subsequent dispersion of the prepolymer provides for an auto-oxidizable waterborne modified oil polyamide polymer.

The reaction below was run under a stream of dry air introduced through the gas inlet on the reactor. A prepolymer was prepared by combining item 1 with items 2 and 3 of the ingredients below at RT (~22° C.) to a 4 neck flask equipped with a thermometer, overhead stirrer and gas inlet. The reaction of DEA with MSO provided an observable but controllable exotherm. The temperature of the reaction mixture was raised to 70° C. and held at this temperature for 1 hour or until the anhydride reaction was complete as indicated by the disappearance of FTIR peaks at about 1863 $cm^{-1}$ and 1786 $cm^{-1}$ of a small sample. At this point the temperature was adjusted to 35° C. and item 4 was added and the mixture homogenized. This produced an exotherm to 45° C. maximum which was adjusted back to 35° C. and held there with stirring for ~2 hours. After checking that the isocyanate content had reached theoretical by titration, item 5 was added and homogenized into the prepolymer.

TABLE 3

| Item # | Material | Parts g |
|---|---|---|
| 1 | Maleated Soybean Oil (MSO) | 200 |
| 2 | Diethanol amine (DEA) | 20.6 |
| 3 | DMM (dipropylene glycol dimethyl ether) | 79.4 |
| 4 | IPDI (isophorone diisocyanate) | 87.4 |
| 5 | TEA (triethanol amine) | 19.8 |

A polyamide-polyurea dispersion was prepared by dispersing 181.3 g of the (neutralized) prepolymer into 370 g of water containing 5.6 g of ethylene diamine and 0.9 g of sodium lauryl sulfate. This resulted in a 24.1 wt. % solids modified oil polyamide dispersion with low sediment, a viscosity of 48 cps (at 25° C.) at a pH of 8.0 and a particle size of 82.0 nm. Coatings of the resulting dispersion dried to a tough tack free film at room temperature (e.g. 24° C.) without added co-solvent and show excellent water resistance after 24 hour cure time.

Example 6

Modified Oil Polyamide Waterborne Dispersion:

This example demonstrates how an NMP free water dispersible modified oil-amide prepolymer with active amine functional group could be prepared. Subsequent dispersion of the prepolymer provides for an auto-oxidizable waterborne modified oil polyamide polymer that is also crosslinkable with reagents that can react with the active hydrogens on the amine, such as compounds containing multiple epoxy, isocyanate, acrylate and acetoacetonate groups The reaction below was run under a stream of dry nitrogen introduced through the gas inlet on the reactor. A prepolymer was prepared by slowly adding item 1 to items 2 and 3 (over a period of ~30 min) of the ingredients below at RT (~20° C.) to a 4 neck flask equipped with a thermometer, overhead stirrer and gas inlet. The reaction of PEI with MSO provided an observable but controllable exotherm with a maximum temperature of 49° C. observed without heating. After an additional 10 minutes of mixing the anhydride reaction was determined to be complete as indicated by the disappearance of FTIR peaks at about 1863 $cm^{-1}$ and 1786 $cm^{-1}$ of a small sample. At this point the temperature was adjusted to 35° C. and item 4 was added and the mixture homogenized which resulted in an exotherm to ~45 C for the resulting prepolymer.

TABLE 4

| Item # | Material | Parts g |
|---|---|---|
| 1 | Maleated Soybean Oil (MSO) | 180.0 |
| 2 | Lupasol FG: a polyethylene imine (PEI) | 137.2 |
| 3 | Dipropylene glycol dimethyl ether (DMM) | 79.3 |
| 5 | TEA (triethanolamine) | 8.9 |

A polyamide-polyurea dispersion was prepared by dispersing 382.5 g of the (neutralized) prepolymer into 440 g of water. This resulted in a 38.5 wt. % solids modified oil polyamide dispersion with a clear amber appearance, low sediment, a viscosity of 202 cps (at 25° C.) at a pH of 10.6 and a Z average particle size of 2225.0 nm, composed of two peaks centered at 2051 nm (78.5% intensity) and 18.7 nm (21.5% intensity). The particle size is quite unusual based on the clarity and low sediment of the dispersion, but the large particle size result was confirmed on two different light scattering instruments. It could be that the resulting waterborne polymer is forming large, but clear, aggregates in water which produce the unusually high average PS effect/result from light scattering measurements.

Combining 90 g of the resulting dispersion with 17.4 g of Heloxy Modifier 48 (a trimethyol propane triglycidyl ether with an epoxy equivalent weight of ~145 g/mol) with mixing over a period of 15 minutes resulted in an opaque dispersion with a slight increase in viscosity; at this point the dispersion was applied to cold rolled steel (CRS) at 5 micron wet. Coatings of the resulting dispersion dried to a tough tack free film at room temperature (e.g. 24° C.) and showed excellent adhesion to the CRS and corrosion resistance after a 7 day cure time.

Example 7

Modified Oil Polyamide-acrylic Waterborne Dispersion:

This example demonstrates how an NMP free water dispersible modified oil-amide prepolymer could be prepared containing an acrylic monomer as a diluent (though not necessarily needed for diluent purposes). Subsequent dispersion of the prepolymer and free radical polymerization of the acrylic provides for a waterborne modified oil polyamide-acrylic polymer with the potential to self-crosslink via residual unsaturation from the maleated oil component.

A prepolymer was prepared by combining items 1 and 2 of the ingredients below at RT (~22° C.) to a 4 neck flask equipped with a thermometer, overhead stirrer and gas inlet. The reaction below was run under a stream of dry nitrogen introduced through the gas inlet on the reactor. The temperature of the reaction mixture was raised to 95° C. and held at this temperature for 2 hour. At this point, the temperature was reduced to 50° C. and item 3 was added followed by the addition of item 4 and the mixture homogenized. The anhydride reaction with the amine was complete as indicated by the FTIR (no anhydride peaks at about 1863 cm$^{-1}$ and 1786 cm$^{-1}$) of a small sample.

TABLE 5

| Item # | Material | Parts g |
|---|---|---|
| 1 | Maleated Soybean Oil (MSO) | 150 |
| 2 | Dynasylan AMMO (3-amino propyl trimethoxysilane) | 26.4 |
| 3 | MMA (methyl methacrylate) | 44.3 |
| 4 | TEA (triethanolamine) | 11.9 |

A polyamide dispersion was prepared by dispersing 108.2 g of the (neutralized) prepolymer into 270 g of water. The pH of the dispersion was 9.9 at this point with a good PS (particle size) and moderate viscosity. An additional 14.6 parts of MMA was added to the dispersion and homogenized in over a period of ~45 minutes. At this point 3.0 g of 2,2'Azobis(2-methylpropionamidine) dihydrochloride was added and the temperature raised to 50-54° C. to initiate the polymerization of the MMA. The dispersion temperature was maintained at 50-54° C. for 1 hour prior to allowing the dispersion to return to room temperature. With the anticipated hydrolysis and partial condensation of the alkoxy silane groups, this resulted in a 27.8 wt. % solids modified oil polyamide-acrylic dispersion with low sediment, a viscosity of 50 cps (at 25° C.) at a pH of 8.7 and a particle size of 152.2 nm. Coatings of the resulting dispersion dried to a tough tack free film at room temperature (e.g. 24° C.) without added co-solvent and show excellent water resistance after a 24 hour cure time.

Example 8

Dimer acid (80.2 parts) and 5.7 parts piperazine were allowed to react at 180° C. for 24 h, then 8.9 parts MDI was added. The prepolymer was allowed to cool to 120° C., then the prepolymer was neutralized with 3.2 parts formic acid and the prepolymer was dispersed into 234 parts water. Repearl MF was added and a film was made, dried and heat-cured at 140° C. The resulting film had low tack and good flexibility and heat resistance.

Example 9

Dimer acid (87.7 parts) and 17.8 parts hexamethylenediamine were allowed to react at 180° C. until the acid number reached 30. The polymer was added to 18.4 parts HMDI (hydrogenated methylene diphenyl diisocyanate) at 100° C., and 6.5 parts TEA (triethanol amine) and dispersed into 263 parts water. The dispersion was blended with 55 part Epirez 3522-W-60 and a film was made. The dry film had good chemical resistance and adhesion to steel.

Example 10

Dimer acid (91.9 parts) and 13.9 parts piperazine were allowed to react at 180° C. until the acid number reached 30. The polymer was added to 18.4 parts HMDI at 100° C., it was then cooled to 90° C. and 6.5 parts TEA. The prepolymer was dispersed into 240 parts water and extended with 2.4 parts hydrazine. The dispersion formed a tack free film with good adhesion to steel.

Each of the documents referred to above is incorporated herein by reference. Unless otherwise indicated, all molecular weights are number average molecular weights. Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration. All of the embodiments of the invention described herein are contemplated from and may be read from both an open-ended and inclusive view (i.e., using "comprising of" language) and a closed and exclusive view (i.e., using "consisting of" language). As used herein parentheses are used designate 1) that the something is optionally present such that monomer(s) means monomer or monomers or (meth)acrylate means methacrylate or acrylate, 2) to qualify or further define a previously mentioned term, or 3) to list narrower embodiments.

While certain representative embodiments and details have been shown for the purpose of illustrating the subject invention, it will be apparent to those skilled in this art that various changes and modifications can be made therein without departing from the scope of the subject invention.

What is claimed is:

1. A water-dispersible polyamide prepared by a process comprising
   (a) reacting at least one polycarboxylic acid and/or anhydride thereof with at least one amine monomer comprising a polyamine with two or more primary or secondary amine groups or an amine-terminated polyamide to produce an amine-terminated polyamide reaction product, and
   (b) reacting the amine terminal groups of said amine-terminated polyamide reaction product with another compound to convert the amine terminal group(s) to an isocyanate terminal group, a vinyl-terminal group, a silane terminal group or an acetoacetonate terminal group, wherein the polyamide reaction product has a titratable acid content of 10 to 60 mg KOH/gram of polyamide and is made dispersible in the water phase by neutralizing the polyamide at a pH of above 7.

2. A water dispersible polyamide according to claim 1, wherein said water dispersible polyamide has a number average molecular weight from about 500 to about 50,000 g/mole.

3. A water dispersible polyamide according to claim 1, wherein said water dispersible polyamide has a number average molecular weight from about 500 to about 30,000 g/mole.

4. A water dispersible polyamide according to claim 1, wherein said polyamide as formed from the reaction of the polycarboxylic acid or anhydride thereof with at least one amine monomer or said amine terminated polyamide has terminal primary or secondary amine groups prior to said further reaction to convert said amine terminal groups.

5. A water dispersible polyamide according to claim 4, wherein at least 50 mole % of said primary or secondary terminal amine groups are secondary amine groups.

6. A chain-extended polyamide dispersion in water prepared by a process comprising
   (a) polyamide condensation reacting at least one polycarboxylic acid and/or anhydride thereof with at least one amine monomer comprising a polyamine with two or more primary or secondary amine groups or an amine-terminated polyamide to produce an amine-terminated polyamide reaction product having at least one terminal amine group with an abstractable hydrogen atom and a titrabable acid content of from about 10 to 60 mg KOH/gram of polyamide,
   (b) mixing the amine-terminated polyamide reaction product obtained in step (a) with water and a substance that raises the pH of the mixture above 7 such that a colloidally stable dispersion of polyamide in water is formed, and
   (c) chain extending the polyamide dispersed in water by reacting with a polyfunctional reactant that forms covalent bonds to the amine terminated group of said polyamide.

7. A polyamide dispersion in water according to claim 3, wherein said polyamide condensation reaction product had a number average molecular weight prior to chain extension of from about 500 to about 50,000 g/mole and has at least two amide linkages derived from said polycarboxylic acid and/or anhydride thereof reacted with said amine monomer.

8. A polyamide dispersion according to claim 3, wherein said polyamide reaction product comprises at least one amine terminal group having at least one abstractable H.

9. A polyamide dispersion according to claim 3, wherein said polyfunctional reactant is an aliphatic or aromatic polyisocyanate.

10. A polyamide dispersion according to claim 8, wherein said polyamide reaction product with at least one terminal amine groups is further functionalized with isocyanate, acetoacetonate, or vinyl terminal groups by reacting said amine terminal group with a reactant capable of forming a covalent bond with an amine terminal group, wherein said reactant also carries an additional isocyanate, silane, acetoacetonate, or vinyl functional group.

11. A process for forming a water dispersion containing a chain-extended polyamide comprising
   a) reacting at least one polycarboxylic acid and/or anhydride thereof with at least one amine monomer comprising a polyamine with two or more primary or secondary amine groups or an amine-terminated polyamide, wherein the ratio of carboxylic acid groups and amine groups is controlled such that the resulting molecules have a titratable acid content of from about 10 to 60 mg KOH per gram of polyamide, to form a polyamide reaction product having on average at least two polyamide linkages per polyamide molecule and having on average at least one terminal amine group with an abstractable hydrogen atom,
   b) neutralizing the residual acid content,
   c) dispersing said polyamide reaction product in an aqueous medium to form a colloidally stable dispersion of polyamide in water, and
   d) chain extending the polyamide reaction product, before or after said dispersing step with a polyfunctional polyisocyanate reactant capable of forming a covalent bond to two or more different amine terminal groups.

12. The process of claim 11, wherein said polyamide reaction product prior to chain extension had on average at least 1.8 terminal secondary amine groups per polyamide molecule.

13. The process of claim 11 wherein an ethylenically-unsaturated monomer is added to said aqueous dispersion comprising the chain-extended polyamide and polymerized to form a hybrid polymer of polyamide and polymer derived from ethylenically-unsaturated monomer.

14. The process of claim 11, wherein said polyamide reaction product with at least one primary or secondary terminal amine group is functionalized after the polyamide forming reaction and before or after dispersing in water by reacting said terminal primary or secondary amine group with a reactant having a reactive group capable of forming a covalent bond with said primary or secondary amine group and carrying an additional isocyanate reactive group, silane, acetoacetonate group, or vinyl group.

* * * * *